United States Patent

Quarderer et al.

[11] Patent Number: 6,048,513
[45] Date of Patent: Apr. 11, 2000

[54] METHOD FOR SYNTHESIS OF HYPOHALOUS ACID

[75] Inventors: George J. Quarderer, Midland, Mich.; David L. Trent, Lake Jackson, Tex.; Erik J. Stewart, Brazoria, Tex.; Danil Tirtowidjojo, Lake Jackson, Tex.; Anil J. Mehta, Lake Jackson, Tex.; Cheryl A. Tirtowidjojo, Lake Jackson, Tex.

[73] Assignee: The Dow Chemical Company, Midland, Mich.

[21] Appl. No.: 08/728,811

[22] Filed: Jan. 10, 1997

Related U.S. Application Data

[60] Provisional application No. 60/025,931, Sep. 11, 1996.

[51] Int. Cl.$^7$ .................................................. C01B 11/04
[52] U.S. Cl. ........................................... 423/473; 422/259
[58] Field of Search ............................ 423/473; 422/259, 422/270

[56] References Cited

U.S. PATENT DOCUMENTS

| | | | |
|---|---|---|---|
| Re. 31,348 | 8/1983 | Wojtowicz et al. | 423/473 |
| 523,263 | 7/1894 | Cannot | 423/473 |
| 972,954 | 10/1910 | Walker | 423/473 |
| 1,227,049 | 5/1917 | Haworth et al. | 423/473 |
| 1,732,230 | 10/1929 | Hershman et al. | 423/274 |
| 2,111,194 | 3/1938 | Sanchez | 423/473 |
| 2,240,344 | 4/1941 | Muskat et al. | 423/473 |
| 2,347,151 | 4/1944 | Crawford et al. | 423/473 |
| 2,941,872 | 6/1960 | Pilo et al. | 422/259 |
| 3,498,924 | 3/1970 | Walsh et al. | 423/473 |
| 3,578,393 | 5/1971 | Wojtowicz et al. | 423/474 |
| 3,578,400 | 5/1971 | Wojtowicz et al. | 423/473 |
| 3,684,437 | 8/1972 | Callerame | 423/472 |
| 3,718,598 | 2/1973 | Wojtowicz et al. | 423/473 |
| 3,896,213 | 7/1975 | Hirdler | 423/473 |
| 4,017,592 | 4/1977 | Penard et al. | 423/473 |
| 4,146,578 | 3/1979 | Brennan et al. | 423/473 |
| 4,190,638 | 2/1980 | Hoekje et al. | 423/473 |
| 4,283,255 | 8/1981 | Ramshaw et al. | 422/270 |
| 4,504,456 | 3/1985 | Yant et al. | 423/473 |
| 4,744,956 | 5/1988 | Yant et al. | 423/473 |
| 5,037,627 | 8/1991 | Melton et al. | 423/473 |
| 5,116,593 | 5/1992 | Melton et al. | 423/473 |
| 5,322,677 | 6/1994 | Shaffer et al. | 423/473 |
| 5,532,389 | 7/1996 | Trent et al. | 549/522 |
| 5,667,760 | 9/1997 | Sweeney | 423/224 |

FOREIGN PATENT DOCUMENTS

1007467 A3   7/1995   Belgium .

OTHER PUBLICATIONS

Adam, et al., "Hypochlorous Acid Decomposition in the pH 5–8 Region", Inorganic Chemistry, vol. 31, pp. 3534–3541 (1992) No month.

Doraiswamy, et al., Heterogeneous Reactions: Analysis, Examples, and Reactor Design, vol. 2: Fluid–Fluid–Solid Reactions, John Wiley & Sons, New York, p. 323 (1984) No month.

Lahiri, et al., Absorption of Chlorine in Aqueous Solutions of Sodium Hydroxide: Desorption of Hypochlorous Acid Followed by Its Dissociation to Chlorine Monoxide, Chemical Engineering Science, vol. 38, No. 7, pp. 119–113 (1983) No month.

Munjal, et al., "Mass–Transfer in Rotating Packed Beds –II. Experimental Results and Comparison with Theory and Gravity Flow", Chemical Engineering Science, vol. 44, No. 10, pp. 2257–2268 (1989) No month.

*Primary Examiner*—Ngoc-Yen Nguyen
*Attorney, Agent, or Firm*—John B. Treangen

[57] ABSTRACT

This invention is a method for forming hypohalous acid in a mass transfer device. The method comprises: (1) feeding into the device a stream of caustic solution comprising at least one alkali or alkaline earth metal of a hydroxide, oxide, hypohalite, bicarbonate, or carbonate; (2) feeding a stream comprising halogen gas into the device; (3) reacting at least some of the halogen gas with the caustic solution to form a solution containing hypohalous acid; (4) desorbing the hypohalous acid from the solution and into the stream of halogen gas; and (5) removing the stream of halogen gas from the device. In this method, the mass transfer device comprises a porous rotor which is permeable to the streams, and is rotated about an axis such that the streams flow through the rotor and the stream of caustic solution flows radially outward from the axis.

27 Claims, 1 Drawing Sheet

METHOD FOR SYNTHESIS OF HYPOHALOUS ACID

CROSS-REFERENCES TO RELATED APPLICATIONS

This Application claims the benefit of U.S. Provisional Application No. 60/025,931 filed Sep. 11, 1996.

BACKGROUND OF THE INVENTION

1. Field of the Invention

This invention relates to a method for forming hypohalous acid. Such a method is particularly useful for preparing low chlorides hypochlorous acid.

2. Description of the Related Art

There are several methods of making hypochlorous acids. When the acids are subsequently to be used for reaction with organic compounds to make such compounds as chlorohydrins, it is generally desirable that the hypochlorous acids have a low content of chloride. Chloride ions are preferably in low concentrations because they contribute to the production of undesirable chlorinated organic byproducts such as di- and tri-chlorides and they accelerate decomposition of hypochlorous acid to chlorates.

Low-chloride aqueous solutions of hypochlorous acid (HOCl) are known to be made by spraying fine droplets of aqueous alkali metal hydroxides or alkaline earth metal hydroxides, for example sodium hydroxide, in a reactor dryer with chlorine gas to make hypochlorous acid gas and solid metal chloride. Creating the spray of fine droplets (50 to 200 microns in diameter) requires high pressures of up to about 1000 psig (about 6900 kPa) which requires a high energy input. The hypochlorous acid gas is condensed along with the water vapor to produce the desired aqueous solutions of hypochlorous acid. Such condensation in the reactor typically requires using refrigeration equipment in order to achieve necessary condensing temperatures of between about −5° C. to 20° C. The product is typically a concentrated hypochlorous acid solution of 35 to 60 percent by weight (wt %) hypochlorous acid. However, this process suffers from several disadvantages: First, there is difficulty in handling solid salt product which includes separation of solid salt particles from gas and removal from the reactor; second, the reactor must operate at high temperatures (e.g. 75–150° C.) to vaporize all of the HOCl and water from the salt; third, the process requires high chlorine to alkali metal hydroxide molar ratios of typically greater than 22:1; and finally, the disclosed process is energy inefficient, requiring large temperature swings on the large recycle gas stream. For example, typically this gas is cooled from the reaction/drying temperature of 75–150° C. to the HOCl/water condensation temperature of −5° to 20° C. and then reheated to 140° C. for recycle to the reactor.

Another process for making aqueous hypochlorous acid is similar to the above described process in that a solution of alkali metal hydroxide is sprayed into a chlorine atmosphere resulting in HOCl vaporization and a dry solid salt. The primary difference with this second process is that the aqueous HOCl solution is produced by absorption of the HOCl in water as opposed to the condensation of the HOCl and water vapor. However, the difficulties of handling the solid salt, high chlorine ratios, and energy inefficiency are the same.

Another process uses an organic solvent to extract HOCl from a brine solution. This process suffers from a need to further remove the HOCl from the organic solvent to produce an aqueous HOCl solution, a need to remove residual solvent from the brine solution, and undesirable reactions of HOCl with the organic solvent.

Therefore, it would be desirable to have a process for preparing aqueous solutions of low chlorides hypochlorous acid which demonstrates any one of the following advantages over the above described methods: continuous and produces higher yields; operates at lower reaction temperatures than typical HOCl processes; does not require handling of solid salt by-products or a spray of fine particle size droplets of caustic; requires lower rates of chlorine gas input; requires less processing and less expensive equipment; and is more energy efficient (i.e., does not require large heating/cooling cycles or high pressure on the liquid feed).

SUMMARY OF THE INVENTION

The invention disclosed herein comprises a method for forming hypohalous acid in a mass transfer device, wherein the method comprises: (1) feeding into the device a stream of caustic solution comprising at least one alkali or alkaline earth metal of a hydroxide, oxide, hypohalite, bicarbonate, or carbonate; (2) feeding a stream comprising halogen gas into the device; (3) reacting at least some of the halogen gas with the caustic solution to form a solution containing hypohalous acid; (4) desorbing the hypohalous acid from the solution and into the stream of halogen gas; and (5) removing the stream of halogen gas from the device. In this method, the mass transfer device comprises a porous rotor which is permeable to the streams, and is rotated about an axis such that the streams flow through the rotor and the stream of caustic solution flows radially outward from the axis. Preferably, the stream comprising halogen gas is fed into the device such that it passes countercurrently to the caustic solution. Such a method is useful for producing high yields of low-chloride hypochlorous acid while avoiding many of the above described problems of the existing HOCl production technologies.

As an example, the chemistry of the HOCl process is illustrated as follows using aqueous sodium hydroxide as an example of a feed of caustic solution. First, chlorine gas is absorbed into the caustic solution in a reversible process.

Chlorine then reacts with the sodium hydroxide to produce a hypochlorite which further reacts with chlorine to produce HOCl.

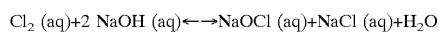

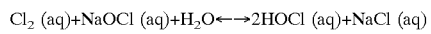

HOCl is then desorbed from the liquid into the gas where it is in equilibrium with its anhydrous form, dichlorine monoxide.

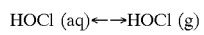

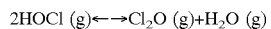

The recovery of the HOCl into low-chlorides water in an absorber is the reverse of these last two reactions. In the aqueous phase and in the presence of chloride ions, HOCl will decompose to chlorate ions.

In order to maximize the recovery of HOCl from the initial hydroxyl or hypochlorite solution, HOCl is desorbed from the solution before it has time to decompose to chlorates. The enhanced mass transfer capability of the rotating mass transfer device allows high (e.g. >95 mol %) recovery of the HOCl while requiring lower gas rates than previous technologies.

Figure 1:
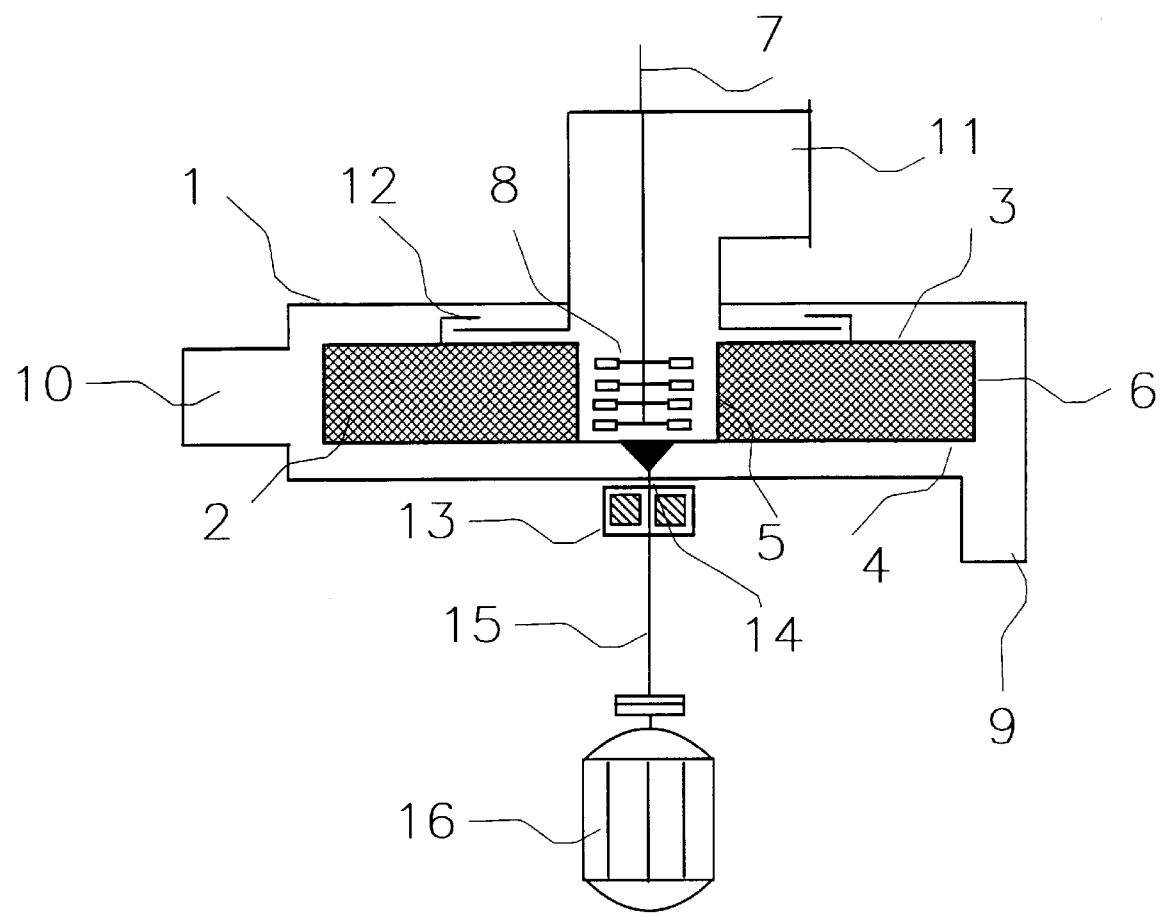
FIG. 1 is one embodiment of the invention. It illustrates housing 1 that contains the porous rotor 2. Porous rotor 2 is comprised of a porous medium such as plates, wire mesh, beads, or solid foam in which the caustic solution and halogen gas are contacted. The porous medium is contained within a pair of radially extending rotor walls 3 and 4. The porous rotor has an inside surface 5, which includes the inside surface of the rotor walls plus the porous medium, and an outside surface 6 which includes the outside surface of the rotor walls.

The liquid caustic solution enters housing 1 through feed line 7 and is distributed on the inside surface area 5 of the rotor medium via liquid inlet ports 8. The centrifugal force generated by the rotation of the rotor causes the caustic solution to flow radially outward such that the liquid exits the rotor at the outside surface 6. The liquid is collected by the housing 1 and is removed through liquid outlet port 9.

Halogen gas, such as chlorine, enters housing 1 through gas inlet port 10. Gas passes through the outside surface 6 of the rotor and through the rotor medium. In the rotor medium a portion of the halogen gas is absorbed into the caustic solution where it reacts to form hypohalous acid. The remainder of the halogen gas acts as a stripping gas such that the hypohalous acid is desorbed from the caustic solution. The halogen gas containing the hypohalous acid exits the rotor at the inside surface 5 and exits the housing 1 through gas outlet port 11.

The rotor is equipped with a seal 12 that prevents gas from by-passing the rotor medium. The seal shown is a liquid ring seal, but could be any device that effectively prevents the gas by-passing, such as a labyrinth seal, mechanical seal, packing gland, or liquid ring seal. The housing 1 also has a seal 13, such as a labyrinth seal, mechanical seal, packing gland, or liquid ring seal, at the rotor drive shaft inlet port 14 on the rotor drive shaft 15 to prevent liquid or gas from exiting the housing at the drive shaft inlet. The drive shaft is connected to the rotor inside the housing on one end and to a drive motor 16 external to the housing on the other end.

DESCRIPTION OF THE PREFERRED EMBODIMENTS

An apparatus is known to be useful for producing counter current contact between two fluids having different specific gravities. See Pilo et al., U.S. Pat. No. 2,941,872 (incorporated herein by reference). Such an apparatus is useful for effecting mass transfer between at least two fluids, wherein "mass transfer" is intended to mean the transfer of at least a portion of one fluid into another fluid. In such an apparatus, the specifically heavier fluid is conducted centrifugally over rotating fixed boundary surfaces in thin layers produced by centrifugal action and the specifically lighter medium is conducted in a turbulent or laminary flow centripetally over the said liquid layers. For example, a common form of mass transfer involves the transfer of a solute from a liquid to a gas, or vice versa. Mass transfer in such an apparatus has been disclosed to be useful for absorption, desorption, counter current extraction, distillation, and homogenization processes.

The invention disclosed herein is a method for forming hypohalous acid using such a mass transfer device. The method is particularly desirable for forming hypochlorous acid, and more preferably, low chlorides aqueous HOCl solution. The term "low chlorides aqueous HOCl solution" is used herein to refer to a solution of hypochlorous acid in water having a hypochlorous acid concentration of at least about 1 wt %, preferably at least about 3 wt %, but less than about 50 wt %, preferably less than about 12 wt %, and which is substantially free of chloride ion. "Substantially free of chloride ion" is meant to mean preferably less than about 1000 parts per million (ppm) chloride ions in the aqueous HOCl solution, more preferably less than about 500 ppm chlorides.

For the method, described hereinafter, the mass transfer device must comprise at least a porous rotor which is permeable to fluid streams, and which may be rotated about an axis such that the streams flow through the rotor and heavier streams flow radially outward from the axis. Such a device may also, therefore, be referred to as a "rotating mass transfer device." Preferably, as illustrated in FIG. 1, the mass transfer device comprises: a housing; a porous rotor which is sealingly engaged within said housing, and which has an inside surface and an outside surface; a liquid inlet port which is in fluid communication with the inside surface of said porous rotor; a means for rotating the porous rotor about an axis such that the caustic solution, entering through the liquid inlet port, flows radially outward from the axis; a gas inlet port into said housing; a gas outlet port for removing gaseous streams from the housing; and a liquid outlet port for removing liquid streams from the housing.

The housing has the function of containing the porous rotor and is equipped with ports for the gas inlet, liquid inlet, gas outlet, liquid outlet, drive shaft for the rotor, and any additionally desired instrumentation. In addition, the housing is sealed at the drive shaft to prevent fluid escape to the environment and is sealed on the rotor to ensure the gas passes through the rotor. The shaft can be attached, for example, to the rotor on one end and the motor on the other end (overhung or cantilever design) or the shaft can extend through the rotor and attach one end to the housing and the other end to the motor (centerhung design). In the latter case the housing would have two ports for the shaft on opposite ends of the housing, each with an appropriate seal. The housing can be oriented such that the drive shaft is positioned either horizontally or vertically. In addition the housing collects the liquid exiting the rotor and directs it to the liquid outlet port for removal.

The porous rotor is constructed of a material which is permeable to both of the streams. When the porous rotor is rotated about the axis, centrifugal force forces liquid, which has been fed into the inside surface of the rotor (e.g. caustic solution), radially outward from the axis through to the outside surface of the porous rotor. It is preferable that the porous rotor comprises a pair of radially extending walls in axially spaced relationship defining annular fluid distribution and fluid contact chambers therebetween concentrically disposed with respect to the axis. It is more preferable that the porous rotor further comprises a packing material disposed within the inside surface of the porous rotor. The packing material may consist of any material which is substantially non-reactive when operated under the conditions of this method and which is useful for increasing dispersion of the liquid (e.g. caustic solution) within the rotor. Typical packing materials include, but are not limited to, wire screen, beads, flat plates, metal or plastic solid foam, and combinations thereof. Typically, such substantially non-reactive packing materials are constructed of metals, plastics, glass, ceramic materials, and combinations thereof. Preferably, the packing material is wetted by the caustic solution to enhance liquid film formation on the packing surface.

The liquid inlet port is in fluid communication with the inside surface of said porous rotor. Such a port is useful for supplying the caustic solution required for the invention claimed herein. Preferably, the liquid inlet port transfers the caustic solution from the axis and into the inside surface of said porous rotor. Similar to the "gas inlet port" (subsequently described), the liquid inlet port is typically in fluid communication with a means for supplying the liquid to the liquid inlet port. For both the liquid and gas inlet ports these means may be any conventional system or apparatus that transports relevant compositions from a source of the compositions into the respective inlet ports. In its simplest form, each means may be a pump operatively connected to a source of the composition such that the relevant composition is pumped from its source and through its respective inlet port. The mass transfer device may further comprise similar means, connected to the gas and liquid outlet ports, for removal of the respective effluent streams from the mass transfer device.

The means for rotating the porous rotor about an axis is such that the porous rotor is rotated and the liquid (e.g. caustic solution), entering through the liquid inlet port, flows radially outward from the axis. Those of skill in the art are capable of providing many alternative means for performing this function. For example, such a means can be a drive shaft which is mounted to the rotor and which is rotated by a motor. It is preferable that the porous rotor is capable of being rotated at a speed which is adequate to provide sufficient centrifugal force for the liquid stream at the rotor's inside diameter. Generally, the centrifugal force is controlled by adjusting the revolutions per minute (RPM's) of the rotor. Typically, the centrifugal force is expressed as multiples of standard gravitational force, g (9.806 m/sec$^2$), and ranges from a lower limit of about 4 g's (39.2 m/sec$^2$), preferably 10 g's (98.1 m/sec$^2$), to an upper limit of about 1000 g's (9806 m/sec$^2$), preferably 400 g's (3922 m/sec$^2$), and more preferably 150 g's (1470 m/sec$^2$).

The gas inlet port into said housing is situated such that the gas enters at the outside periphery of the rotor so that the gas will pass through the outer surface area of the rotor and, preferably, move countercurrently to the caustic solution. Optionally, however, the gas may be introduced to the housing and rotor such that the gas passes cocurrently with the liquid. In this case the gas inlet port is situated such that the gas enters at or near the axis of the rotor and passes through the inside surface area of the rotor, exits at the outside periphery of the rotor, and exits the housing through a gas outlet port.

The gas outlet port is for removing gaseous streams from the mass transfer device. Preferably, the gas outlet port is positioned at or near the axis of the rotor and is capable of removing gaseous streams exiting the inside surface area of the rotor from the housing.

The liquid outlet port is positioned to allow liquid, collected in the housing, to be drained or pumped from the housing. It is preferred that a sufficient liquid level is maintained in the liquid outlet port to prevent gas from exiting through this port.

The first step of the method of this invention is to feed a stream comprising caustic solution into the mass transfer device. Preferably, the stream is fed through the liquid inlet port into the inside surface of the porous rotor. The pressure typically required to introduce the caustic solution into the device is generally less than about 450 kPa. For purposes of this invention, "caustic solution" is intended to comprise any stream which comprises at least one alkali or alkaline earth metal of a hydroxide, oxide, hypohalite, bicarbonate, or carbonate. For example, preferable caustic solutions comprise aqueous mixtures containing compounds such as calcium hydroxide ($Ca(OH)_2$), sodium hydroxide (NaOH), magnesium hydroxide ($Mg(OH)_2$), potassium hydroxide (KOH), sodium carbonate ($Na_2CO_3$), sodium bicarbonate ($NaHCO_3$), calcium carbonate ($CaCO_3$), and calcium oxide (CaO). Preferable hypohalites include alkali metal hypochlorites (e.g. sodium hypochlorite (NaOCl)) and alkaline earth metal hypochlorites (e.g. calcium hypochlorite ($Ca(OCl)_2$). Preferably, the alkali metal hydroxide is either sodium or potassium hydroxide. More preferably, the alkali metal hydroxide is sodium hydroxide, the alkali metal hypochlorite is sodium hypochlorite, the alkaline earth metal hydroxide is calcium hydroxide, and the alkaline earth metal hypochlorite is calcium hypochlorite. Furthermore, while the word "solution" is used throughout to describe the caustic, such term is also intended to include mixtures and slurries.

It may also be preferable to further include in the feed of the caustic solution a halide salt of the corresponding alkali metal or alkaline earth metal. Generally, the halide employed for the salt is the same halide which is derived from the reaction of the halogen gas with the caustic solution. Surprisingly, the addition of this salt enhances the recovery of hypohalous acid even though the halide accelerates the decomposition of hypohalous acid. Such a salt, however, should not be provided in an amount which exceeds the saturation limit of any of the components which are present in the mass transfer device. Any precipitation of solids from the solution could result in plugging of the porous rotor resulting in increased pressure drop, reduced mass transfer, and lower product yields. The "saturation limit" of a component is defined as the highest concentration of the component in a given solution where the component and the solution exist as one phase (i.e., liquid). Beyond the saturation limit, the excess amount of the component would form as a separate solid phase or "precipitate". The degree of saturation depends upon temperature, pressure, and the concentration of other components present in the solution.

The second step of the method comprises feeding a stream comprising halogen gas into the device. Preferably, the stream is fed such that it passes countercurrently to the caustic solution. Preferred halogen gases are chlorine, bromine, and iodine. If the desired hypohalous acid product is hypochlorous acid, then the halogen gas should be chlorine. Since hypochlorous acid (HOCl) is currently felt to be of higher commercial significance, much of the subsequent description will illustrate using chlorine gas to produce HOCl. However, in light of the disclosure herein, those of skill in the art will easily recognize how to use any halogen to form its respective hypohalous acid. Generally, the halogen is supplied in an amount in stoichiometric excess to that required for formation of the hypohalous acid. For example, the molar ratio of chlorine gas to the product hypochlorous acid, on a stoichiometric 100 percent yield basis, is at least about 3 to about 15. Higher ratios can be used, but provide little additional benefit and require larger equipment. Although the feed stream may consist of pure chlorine gas, it is preferable that the stream comprises a mixture of recycled and fresh halogen. More preferably, the stream also contains steam (water vapor). The steam is useful, for example, for providing heat for vaporization and temperature control within the device. In addition the feed gas may typically contain inert gases such as nitrogen. The chlorine content of the feed gas is at least about 20 percent by volume. The total amount of gas (chlorine, steam, and inerts) is provided in amount of about 10 to about 200 gram-moles gas per liter of caustic solution, preferably about 15 to about 100 gram-moles gas per liter of caustic solution. Higher volumes of gas can be used, but generally provide little additional benefit and require larger equipment.

The third step of the method comprises reacting at least some of the halogen gas with the caustic solution to form a solution containing hypohalous acid. For example, when a chlorine gas is reacted with a caustic solution containing sodium hydroxide in the mass transfer device, a solution of hypochlorous acid and sodium chloride is formed. This reaction is believed to occur on the surface of the caustic solution as chlorine is absorbed. The reaction is considered to be essentially instantaneous. The centrifugal force generated by the spinning rotor and the high surface area of the porous packing spread the caustic solution into very thin liquid films which increases the rate at which chlorine is absorbed into, and reacted with, the caustic solution.

The fourth step of the method comprises desorbing the hypohalous acid from the solution and into the stream of halogen gas. The thin liquid films created by the centrifugal force of the spinning rotor and the surface area of the porous rotor packing also enhance the desorption of the hypohalous acid into the halogen gas stream, minimizing the decomposition reaction to byproducts such as chlorates.

The fifth step of the method comprises removing the stream of halogen gas, generated in the fourth step, from the device. Such removal of the halogen gas is preferably through the gas outlet port.

Those of skill in the art are capable of optimizing operating conditions within the mass transfer device in light of the disclosure herein. Such conditions include temperature, pressure, gas/liquid ratio, gas and liquid compositions, pH, and centrifugal force provided at the rotor's inside diameter. Generally, the temperatures during the method range from a lower limit of about 20° C., preferably 40° C., to a higher limit of about 100° C., preferably 90° C. Generally, the pressures during the method range from a lower limit of about 20 kPa, preferably 40 kPa, and more preferably 65 kPa, to a higher limit of about 500 kPa, preferably 250 kPa, and more preferably 200 kPa. Typically, the pH of the caustic solution feed ranges from about 7 to about 14, depending on the caustic solution used. In light of the disclosure herein, those of skill in the art will equally recognize that the mass transfer device may be useful for other liquid-gas reaction methods such as, for example, feeding liquid hypohalous acid (e.g. HOCl) into the mass transfer device through the liquid inlet port in order to react with an olefin gas to form an olefin halohydrin (e.g. propylene chlorohydrin).

It is preferable that the hypohalous acid forming method of this invention further comprise a step of collecting any effluent liquid exiting the housing through the liquid outlet port, recovering halogen from the liquid, and recycling the halogen back for use in the feed of halogen gas. Typically, in the manufacture of HOCl, the liquid exiting the rotor is a solution of a chloride salt of alkali metal or alkaline earth metal, hypochlorous acid, and chloric acid at a pH of about 2 to 5. One method for recovering the chlorine from the liquid effluent of the mass transfer device is to treat the liquid, at temperatures typically between 80 to 180° C., with HCl, which reacts with the chloric acid and hypochlorous acid to generate chlorine gas which is degassed from the solution. Preferably, when the liquid effluent recovered after producing HOCl is comprised of sodium chloride, the liquid is recycled to a chlor-alkali electrochemical cell, to form chlorine and a sodium hydroxide caustic solution. The chlorine and caustic may then be recycled back for use in forming more HOCl in the mass transfer device. It is generally preferred, prior to recycling into the chlor-alkali electrochemical cell, to remove any impurities from the liquid effluent stream. These impurities typically comprise HOCl decomposition products such as chloric acid and sodium chlorate. A method for removing these impurities may include acidification and chlorinolysis or absorption on carbon or zeolites as is well known in the art. Such methods for removing impurities before passing through a chlor-alkali electrochemical cell are described in U.S. Pat. Nos. 4,126,526, 4,240,885, and 4,415,460 each of which are incorporated herein by reference. A method for recycling similar liquid effluent streams is disclosed in U.S. Pat. No. 5,486,627, issued to The Dow Chemical Company and incorporated herein by reference.

It is also preferable that the method of this invention further comprise collecting any effluent gas exiting the housing through the gas outlet port, recovering the hypohalous acid (e.g. HOCl), and absorbing the acid in water, preferably low-halide water, to produce a low-halides aqueous product of hypohalous acid. In the manufacture of HOCl, the effluent gas exiting the housing typically comprises chlorine, water, HOCl, dichlorine monoxide, and inerts. One method of recovering the HOCl is by absorption when the effluent gas is passed countercurrently to a low-chlorides water stream in, for example, a packed column. Any device known in the art for affecting absorption of gases into liquids is suitable. This device may include, but is not limited to, a trayed column, packed column, venturi, stirred tank, bubble tower, or a mass transfer device similar to that herein described for the production of hypohalous acid. It is desirable to also condense or absorb the dichlorine monoxide into the low-chlorides water stream. The low-chlorides aqueous HOCl may further be purified by purging it with an inert gas such as $N_2$ to remove a portion of the dissolved chlorine. This purge stream containing chlorine gas may be recycled to the mass transfer device for generating HOCl. Generally, the resulting concentration of low chlorides aqueous hypochlorous acid is between about 1 to about 50 wt %, preferably, 1 to about 12 wt %. The temperature of the absorption is typically about 10 to about 80° C., preferably about 30 to about 60° C. Optionally, the HOCl is condensed along with the water vapor at lower temperatures of about −5 to about 20° C. This is not preferred, however, due to the energy inefficiency of such a process and the requirement for refrigeration equipment. Finally, excess halogen gas from the effluent gas may be recycled back to the stream of halogen gas entering into the mass transfer device.

EXAMPLES

The invention will be further clarified by a consideration of the following examples, which are intended to be purely exemplary of the use of the invention.

Example 1

Reaction of Gaseous Chlorine with Calcium Hypochlorite Solutions to Form and Separate HOCl Using a Mass Transfer Device The packed rotor of this example had a 3.2-inch (81.3 mm) inner diameter and a 16-inch (406.4 mm) outer diameter. The bed was packed with a continuous titanium wire screen wound as a spool between two titanium plates. The packing had a specific surface area of 2700 m$^2$/m$^3$ and a porosity (void fraction) of 0.905. The height of the packed rotor was 1 inch (25.4 mm).

A stream of aqueous solution comprising 10.21 wt % Ca(OCl)$_2$, 7.92 wt % CaCl$_2$, and 0.063 wt % ClO$_3$– ion in water solution was preheated to 76° C. and distributed onto the inner diameter of the packed rotor surface at a 35.7 kg/hr rate. The feed pressure required to introduce the liquid was 20 psig (138 kPa gauge). A stream of recycled chlorine gas comprising 98.3 mol % chlorine and 1.7 mol % water was supplied at a rate of 59.5 kg/hr by a blower and was combined with fresh chlorine at 4.5 kg/hr and steam at 5.8 kg/hr. The combined stream comprising chlorine gas was introduced at 69° C. to the housing of the rotor and passed from the outside surface of the rotor to the inner surface. The pressure at the inside surface of the rotor was 640 mm Hg (85.3 kPa). The molar ratio of chlorine gas to stoichiometric HOCl was 8.8.

The rotor was spun with an electric motor via a sealed shaft. A motor control maintained the rotor spin at 1500 revolutions per minute (RPM) creating centrifugal force at the inner diameter acting on the liquid at 102 times that of gravity. The seals on the shaft and rotor were flushed with water at a rate of 26.4 kg/hr that entered the housing and mixed with the liquid effluent from the rotor before being discharged.

A brine stream, stripped of HOCl, exited the bottom of the housing via the liquid outlet port at a rate of 61.3 kg/hr. The brine stream included brine effluent from both the rotor and seal flush water. Ion chromatography analysis of this brine indicated 0.395 wt % chlorates (ClO$_3$–). Iodometric titration of the brine solution provided a composition analysis of 0.258 wt % HOCl.

All of the stripped and desorbed HOCl (HOCl was in equilibrium with dichlorine monoxide in the vapor phase), uncondensed water vapor, and unreacted chlorine from the reaction and subsequent stripping exited from the center of the rotor and out of the housing through the gas outlet port.

The vapor removed from the rotor went to the bottom of a vertical glass absorber column (150 mm inside diameter, 3.05 m overall length) operating at 600 mm Hg (80 kPa) pressure absolute, and containing two packed sections each filled with ceramic saddle-shaped packing (commercially available from Norton Company under the trade designation INTALOX™ saddles). The lower packed section included a 0.38 m bed of ½ inch (12.7 mm) INTALOX™ saddles resting on a packing support approximately 6 inches (152 mm) above the vapor entrance to the absorber. Liquid from the bottom of the absorber was pumped through a shell and tube heat exchanger at 5–10 liter/min using a centrifugal pump. The absorber bottoms were chilled in the exchanger to approximately 5–10° C. (using ethylene glycol at 0–3° C. as a refrigerant) and then fed onto the top of the lower packed section where it combined with liquid from the upper packed section. Fresh condensate water at 5–10° C. was fed at a 45.4 kg/hr rate to the top of the absorber column where it was then distributed across the top of the upper packed section consisting of a 1.3 m (height) bed of ¼ inch (6.35 mm) saddles resting on a perforated packing support approximately 18 inches (457 mm) above the lower section of packing.

Essentially all of the water vapor and the HOCl was condensed in the lower packed section of the absorber. Any remaining amounts of HOCl and/or Cl$_2$O vapor were recovered in the upper section of packing by counter current contact with the chilled water. The absorber bottoms liquid (59.1 kg/hr) was analyzed by iodometric titration as 7.35 wt % HOCl. Excess unreacted chlorine was vented through the top of the absorber column and to the vacuum source provided by a water eductor, while most of the chlorine vapor was recycled back to the housing of the mass transfer device via a gas blower. The recovered HOCl yield in the absorber (based on Ca(OCl)$_2$ fed to the mass transfer device) was 80.2%.

This Example demonstrates that hypochlorous acid can be recovered in high yield when formed and quickly separated from Ca(OCl)$_2$ and brine solutions using the rotating mass transfer device in a stripper/absorber process in which chlorine vapor is recycled between the two devices. Further the rotating mass transfer device allows reduction in chlorine gas rates required for reaction and stripping of the HOCl solution.

Example 2

Reaction of Gaseous Chlorine and Aqueous Sodium Hydroxide, Substantially Without Sodium Chloride, and with Stripping of Product HOCL from the Brine Solution The same rotating packed bed device as in Example 1 was used. A 9.8 wt % sodium hydroxide aqueous solution containing <0.2 wt % sodium chloride and 0.02 wt % chlorate ion was preheated to 63° C. and distributed onto the inside surface area of the rotor packing at a rate of 73 lb/hr (33.1 kg/hr). The feed pressure required to introduce the liquid was 13.1 psig (90 kPa gauge). The recycle gas (84.2 mol % chlorine, 1.6 mol % water, and 14.2 mol % nitrogen) at a rate of 130 lb/hr (59.0 kg/hr) was combined with 25.5 lb/hr (11.6 kg/hr) fresh chlorine and 20 lb/hr (9.1 kg/hr) steam and fed to the outside surface area of the rotor at 75° C. The pressure at the inside diameter of the rotor was 650 mm Hg (86.6 kPa). The rotor was spun at 1004 RPM, creating a centrifugal force 45.8 times that of gravity at the inside diameter. The molar ratio of chlorine gas to stoichiometric HOCl was 10.9.

Brine exited the rotor at a rate of 198 lb/hr (89.9 kg/hr) and included 109 lb/hr (49.5 kg/hr) seal flush water. The brine contained 0.114 wt % chlorate ion and 0.36 wt % HOCl, representing a combined yield loss of 15.8 mol % based on the initial sodium hydroxide. The HOCl vaporized from the brine was absorbed in low-chlorides water to yield a product of 3.49 wt % HOCl at a rate of 228 lb/hr (103.5 kg/hr). The HOCl yield was 84.2 mol % based on the starting sodium hydroxide.

This example shows high yields of HOCl from sodium hydroxide solutions using low chlorine gas ratios.

Example 3

Reaction of Gaseous Chlorine and Aqueous Sodium Hydroxide with Sodium Chloride and with Stripping of Product HOCl from the Brine Solution The same rotating mass transfer device as in Example 1 was used except that the inside diameter of the packing was 4.0 inches (101.6 mm). A 9.0 wt % sodium hydroxide aqueous solution containing 12.2 wt % sodium chloride and 0.022 wt % chlorate ion was preheated to 61° C. and distributed onto the inside surface area of the rotor packing at a rate of 122 lb/hr (55.4 kg/hr). The feed pressure required to introduce the liquid was 16.8 psig (116 kPa gauge). The recycle gas (92.0 mol % chlorine, 2.9 mol % water, and 5.1 mol % nitrogen) at a rate of 96 lb/hr (43.6 kg/hr) was combined with 35 lb/hr (15.9 kg/hr) fresh chlorine and 35 lb/hr (15.9 kg/hr) steam and fed to the outside surface area of the rotor at 84° C. The pressure at the inside diameter of the rotor was 650 mm Hg (86.6 kPa). The rotor was spun at 1019 RPM, creating a centrifugal force 59 times that of gravity at the inside diameter of the rotor. The molar ratio of chlorine gas to stoichiometric HOCl was 6.4.

Brine exited the rotor at a rate of 157 lb/hr (71.4 kg/hr) and included 14 lb/hr (6.4 kg/hr) seal flush water. The brine contained 0.178 wt % chlorate ion and 0.085 wt % HOCl, representing a combined yield loss of 8.1 mol % based on the initial sodium hydroxide. The HOCl vaporized from the brine was absorbed in low-chlorides water to yield a product of 4.33 wt % HOCl at a rate of 309 lb/hr (140.3 kg/hr). The HOCl yield was 91.9 mol % based on the starting sodium hydroxide.

This example illustrates high yields of HOCl from sodium hydroxide solutions with low chlorine gas ratios and enhancement due to presence of sodium chloride in the feed liquid.

Other embodiments of the invention will be apparent to the skilled in the art from a consideration of this specification or practice of the invention disclosed herein. It is intended that the specification and example be considered as exemplary only, with the true scope and spirit of the invention being indicated by the following claims.

What is claimed is:

1. A method for forming low chlorides aqueous hypochlorous acid in a mass transfer device, wherein the method comprises:
   (a) feeding a stream comprising caustic solution into the device;
   (b) feeding a stream comprising chlorine gas into the device;
   (c) reacting at least some of the chlorine gas with the caustic solution to form a solution containing hypochlorous acid;
   (d) desorbing the hypochlorous acid from the solution and into the stream of chlorine gas;
   (e) removing the stream of chlorine gas and hypochlorous acid in step (d) from the device; and
   (f) recovering, into an aqueous solution, the hypochlorous acid from the removed stream of chlorine gas to form the low chlorides aqueous hypochlorous acid;
   wherein the mass transfer device comprises a porous rotor which is permeable to the streams, and is rotated about an axis such that the streams flow through the rotor and the stream of caustic solution flows radially outward from the axis, wherein the ratio of the stream comprising chlorine gas in Step (b) to caustic solution in Step (a) is between about 10 to about 200 moles of gas per liter of solution, and wherein the method is conducted under conditions in which precipitation of solids in the mass transfer device does not occur in an amount which results in plugging of the porous rotor.

2. The method of claim 1 wherein the mass transfer device comprises:
   (a) a housing;
   (b) a porous rotor, sealingly engaged within said housing, and having an inside surface and an outside surface;
   (c) a liquid inlet port which is in fluid communication with the inside surface of said porous rotor;
   (d) a means for rotating the porous rotor about an axis such that the caustic solution, entering through the liquid inlet port, flows radially outward from the axis;
   (e) a gas inlet port into said housing;
   (f) a gas outlet port for removing gaseous streams from the housing; and
   (g) a liquid outlet port for removing liquid streams from the housing;
   wherein, when the porous rotor is rotated about the axis, centrifugal force forces the caustic solution through to the outside surface of the porous rotor.

3. The method of claim 2 wherein the porous rotor comprises a pair of radially extending walls in axially spaced relationship defining annular fluid distribution and fluid contact chambers therebetween concentrically disposed with respect to the axis.

4. The method of claim 2 wherein the porous rotor contains a packing material.

5. The method of claim 4 wherein the packing material is selected from the group consisting essentially of wire screen, beads, plates, solid foam, and combinations thereof.

6. The method of claim 5 wherein the packing material is constructed of substantially non-reactive metal, plastic, glass, or ceramic materials.

7. The method of claim 2 wherein the means for rotating the porous rotor is a drive shaft which is mounted to the rotor and that is rotated by a motor.

8. The method of claim 1 wherein the stream of caustic solution comprises at least one alkali or alkaline earth metal of a hydroxide, oxide, hypohalite, bicarbonate, or carbonate.

9. The method of claim 1 wherein the caustic solution contains at least one compound selected from the group consisting of calcium hydroxide, sodium hydroxide, magnesium hydroxide, potassium hydroxide, sodium carbonate, sodium bicarbonate, calcium carbonate, calcium oxide, sodium hypochlorite, and calcium hypochlorite.

10. The method of claim 1 wherein the feed of caustic solution further comprises a halide of the corresponding alkali or alkaline earth metal in an amount not to exceed a saturation limit resulting in precipitation of any of the components which are present in the mass transfer device.

11. The method of claim 2 further comprising collecting any effluent liquid exiting the housing through the liquid outlet port, recovering chlorine gas from the effluent liquid, and recycling the chlorine gas back for use in the stream comprising chlorine gas.

12. The method of claim 11 wherein the chlorine gas is recovered by treating the liquid with hydrochloric acid.

13. The method of claim 11 wherein, after recovering the chlorine gas, the effluent liquid is recycled to an electrochemical cell for production of chlorine and metal hydroxide.

14. The method of claim 1 wherein the feed of chlorine gas comprises a mixture of recycled and fresh chlorine in stoichiometric excess of that required for formation of the hypochlorous acid.

15. The method of claim 14 wherein a molar ratio of chlorine gas to the product hypochlorous acid, on a stoichiometric 100 percent yield basis, is at least about 3 to about 15.

16. The method of claim 1 wherein the feed of chlorine gas further comprises steam.

17. The method of claim 1 wherein the feed of chlorine gas contains at least about 20 mole percent chlorine gas.

18. The method of claim 1 wherein the feed of chlorine gas is fed into the device such that it passes countercurrently to the caustic solution.

19. The method of claim 2 wherein the effluent gas exiting the housing through the gas outlet port comprises chlorine, water, HOCl, dichlorine monoxide, and inerts.

20. The method of claim 19 wherein the low chlorides aqueous hypochlorous acid is recovered by condensation or absorption when the effluent gas is passed countercurrently to a low chlorides water stream.

21. The method of claim 20 further comprising purging the low-chlorides aqueous hypochlorous acid with an inert gas.

22. The method of claim 19 wherein excess chlorine gas is recycled back to the stream comprising chlorine gas.

23. The method of claim 1 wherein the temperature during the method ranges between 20 to about 100° C.

24. The method of claim 1 wherein the pressure during the method ranges between 20 to about 500 kPa.

25. The method of claim 1 wherein the gravitational force at the rotor's inside diameter is between about 4 to about 1000 g's (39.2 to about 9806 m/sec$^2$).

26. The method of claim 1 wherein the low chlorides aqueous hypochlorous acid is recovered in step (f) by absorption in a low chlorides water.

27. The method of claim 16 wherein the low chlorides aqueous hypochlorous acid is recovered in step (f) by condensation.

* * * * *